United States Patent
Nasu et al.

(10) Patent No.: US 11,648,810 B2
(45) Date of Patent: May 16, 2023

(54) VEHICLE, VEHICLE MOTION STATE ESTIMATION APPARATUS, AND METHOD FOR ESTIMATING VEHICLE MOTION STATE

(71) Applicant: Hitachi Automotive Systems, Ltd., Hitachinaka (JP)

(72) Inventors: Shingo Nasu, Tokyo (JP); Shinji Seto, Tokyo (JP); Nobuyuki Ichimaru, Hitachinaka (JP); Ryusuke Hirao, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 444 days.

(21) Appl. No.: 16/956,356

(22) PCT Filed: Oct. 4, 2018

(86) PCT No.: PCT/JP2018/037217
§ 371 (c)(1),
(2) Date: Jun. 19, 2020

(87) PCT Pub. No.: WO2019/138617
PCT Pub. Date: Jul. 18, 2019

(65) Prior Publication Data
US 2020/0331317 A1    Oct. 22, 2020

(30) Foreign Application Priority Data

Jan. 10, 2018 (JP) .............................. JP2018-001705

(51) Int. Cl.
*B60G 17/0165*     (2006.01)
*B60G 17/019*      (2006.01)
*B60G 21/08*       (2006.01)

(52) U.S. Cl.
CPC ... *B60G 17/0165* (2013.01); *B60G 17/01908* (2013.01); *B60G 21/08* (2013.01);
(Continued)

(58) Field of Classification Search
None
See application file for complete search history.

(56) References Cited

U.S. PATENT DOCUMENTS 5,434,782 A * 7/1995 Henry ................ B60G 17/0157
701/37
11,318,804 B2 * 5/2022 Minakuchi ........... B60W 40/112
(Continued)

FOREIGN PATENT DOCUMENTS

JP    2008-094387 A    4/2008
JP    2012-047553 A    3/2012
(Continued)

OTHER PUBLICATIONS

International Search Report with English translation and Written Opinion issued in corresponding application No. PCT/JP2018/037217 dated Nov. 20, 2018.

*Primary Examiner* — Navid Z. Mehdizadeh
(74) *Attorney, Agent, or Firm* — Foley & Lardner LLP

(57) ABSTRACT

Provided are a vehicle, a vehicle motion state estimation apparatus, and a method for estimating a vehicle motion state capable of highly accurately estimating a state quantity of a bounce motion of a vehicle having a non-linear suspension characteristic. The vehicle motion state estimation apparatus in a vehicle, in which wheels and a vehicle body are coupled via a suspension, includes a bounce motion estimation unit that estimates and outputs a state quantity of a bounce motion of the vehicle based on traveling state information of the vehicle, and a correction value estimation unit that calculates a correction value to correct an output the bounce motion estimation unit. The correction value esti-
(Continued)

mation unit calculates the correction value in consideration of a non-linear characteristic of the suspension.

16 Claims, 8 Drawing Sheets

(52) U.S. Cl.
CPC ............... *B60G 2400/0523* (2013.01); *B60G 2400/104* (2013.01); *B60G 2400/106* (2013.01); *B60G 2400/208* (2013.01); *B60G 2400/252* (2013.01); *B60G 2400/41* (2013.01); *B60G 2401/28* (2013.01)

(56) References Cited

U.S. PATENT DOCUMENTS

| | | |
|---|---|---|
| 2008/0066991 A1 | 3/2008 | Kataoka |
| 2013/0231838 A1 | 9/2013 | Shiozawa |
| 2015/0088379 A1* | 3/2015 | Hirao .................. B60G 17/016 701/37 |
| 2015/0183289 A1 | 7/2015 | Koumura |
| 2018/0111439 A1* | 4/2018 | Yamamoto ......... B60G 17/0182 |

FOREIGN PATENT DOCUMENTS

| | | |
|---|---|---|
| JP | 2014-019335 A | 2/2014 |
| JP | 2015-123895 A | 7/2015 |

\* cited by examiner

VEHICLE, VEHICLE MOTION STATE ESTIMATION APPARATUS, AND METHOD FOR ESTIMATING VEHICLE MOTION STATE

TECHNICAL FIELD

The present invention relates to estimating a vehicle motion state quantity, and in particular, to a vehicle, a vehicle motion state estimation apparatus, and a method for estimating a vehicle motion state, which estimate a bounce motion state quantity.

BACKGROUND ART

As a method for acquiring a bounce motion state quantity of a vehicle, in addition to a method for directly detecting using a dedicated sensor such as a vehicle height sensor or a vertical acceleration sensor, there is known a method for estimation using a vehicle dynamics model from a general vehicle-mounted sensor such as a wheel speed sensor or the like as described in PTL 1 instead of a dedicated sensor.

CITATION LIST

Patent Literature

PTL 1: JP 2012-47553 A

SUMMARY OF INVENTION

Technical Problem

However, the method for estimating the bouncing motion state quantity described in PTL 1 assumes that the characteristics of the suspension, particularly the relationship between a vertical relative displacement of the vehicle body and the wheels and a longitudinal displacement of the wheels, are linear. When being applied to a non-linear vehicle, there is a possibility that the estimation accuracy of the bounce motion state quantity is greatly reduced.

The invention has been made to solve the above-mentioned problem, and an object thereof is to provide a vehicle, in which the relationship between the vertical relative displacement of the vehicle body and the wheels and the longitudinal displacement of the wheels is non-linear, and the bounce motion state quantity can be estimated with high accuracy, a vehicle motion state estimation apparatus, and a method for estimating a vehicle motion state.

Solution to Problem

From the above, according to the invention, there is provided "A vehicle motion state estimation apparatus in a vehicle, in which wheels and a vehicle body are coupled via a suspension, including a bounce motion estimation unit that estimates and outputs a state quantity of a bounce motion of the vehicle based on traveling state information of the vehicle, and a correction value estimation unit that calculates a correction value to correct an output the bounce motion estimation unit, wherein the correction value estimation unit calculates the correction value in consideration of a non-linear characteristic of the suspension".

Further, in the invention, there is provided "A vehicle motion state estimation apparatus in a vehicle in which wheels and a vehicle body are coupled via a suspension, including a vertical motion estimation unit that estimates and outputs a state quantity of a vertical motion of the vehicle based on traveling state information of the vehicle, and a correction value estimation unit that calculates a correction value to correct an output the vertical motion estimation unit, wherein the correction value estimation unit calculates the correction value in consideration of a non-linear characteristic of a suspension".

Further, in the invention, there is provided "A vehicle in which wheels and a vehicle body are coupled via a suspension, and an output to a braking/driving control unit for controlling braking/driving, a steering control unit for controlling a steering angle of the wheels, and a vehicle motion state estimation apparatus for providing an output to the braking/driving control unit and the steering control unit are mounted, wherein the vehicle motion state estimation apparatus is the vehicle motion state estimation apparatus according to any one of claims 1 to 8".

Further, in the invention, there is provided "A method for estimating a vehicle motion state in a vehicle in which wheels and a vehicle body are coupled via a suspension, wherein a state quantity of a vertical motion of the vehicle is estimated based on traveling state information of the vehicle, a correction value is calculated based on the state quantity of the vertical motion of the vehicle, and the correction value is a correction value in consideration of a non-linear characteristic of the suspension".

Further, in the invention, there is provided "A method for estimating a vehicle motion state in a vehicle in which wheels and a vehicle body are coupled via a suspension, wherein a rotational motion state quantity of the vehicle is obtained from traveling state information of the vehicle, a wheel speed fluctuation quantity is obtained from the traveling state information and the rotational motion state quantity, a bounce motion quantity of the vehicle is obtained from the rotational motion state quantity and the wheel speed fluctuation quantity, and the bounce motion quantity and the rotational motion state quantity are set as vertical motion state quantities of the vehicle, and wherein a correction value of the bounce motion quantity or the vertical motion state quantity is obtained from the traveling state information, the bounce motion quantity, or the vertical motion state quantity, and the correction value is a correction value in consideration of a non-linear characteristic of the suspension".

Advantageous Effects of Invention

According to the invention, a vehicle motion state can be estimated with high accuracy regardless of linear or non-linear suspension characteristics.

DESCRIPTION OF EMBODIMENTS

Hereinafter, embodiments of the invention will be described in detail using the drawings.

First Embodiment

A vehicle motion state estimation apparatus 50 according to a first embodiment will be described with reference to FIGS. 1 to 10.

Figure 1:
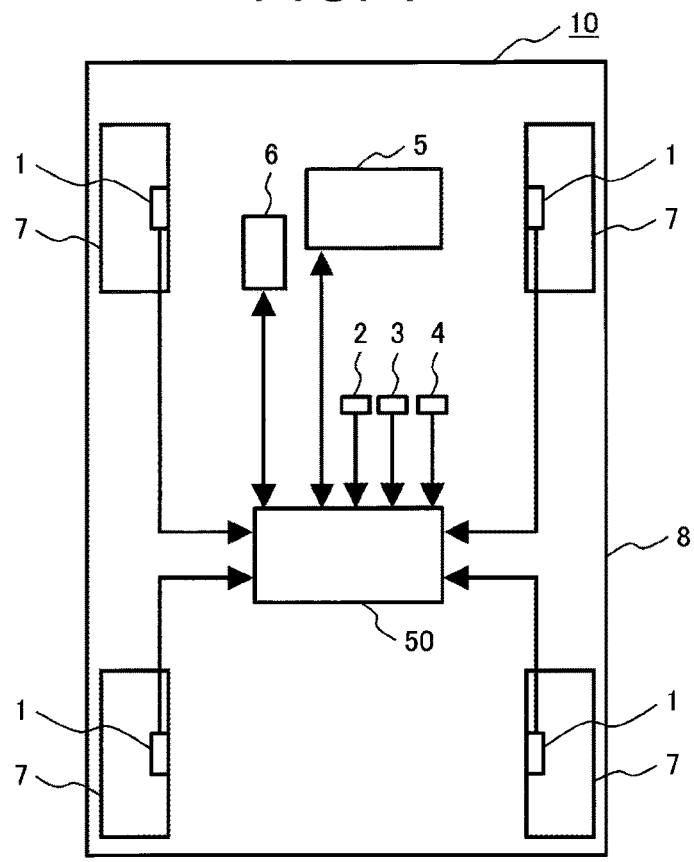
FIG. 1 is a diagram illustrating an example of a vehicle configuration equipped with a vehicle motion state estimation apparatus 50 according to a first embodiment.

FIG. 1 illustrates a configuration example of a vehicle 10 equipped with the vehicle motion state estimation apparatus 50.

The vehicle motion state estimation apparatus 50 is mounted on the vehicle 10, and is connected to a wheel speed sensor 1, an acceleration sensor 2, a gyro sensor 3, a steering angle sensor 4, a braking/driving control unit 5, and a steering control unit 6.

The sensors (the wheel speed sensor 1, the acceleration sensor 2, the gyro sensor 3, and the steering angle sensor 4) mounted on the vehicle 10 described above are generally mounted sensors, and are not so-called dedicated sensors.

The vehicle motion state estimation apparatus 50 detects the rotational speeds of the four wheels 7 at the front, rear, left and right of a vehicle body 8 with the wheel speed sensor 1, detects the acceleration acting on the center of gravity of the vehicle body 8 with the acceleration sensor 2, detects the yaw rate, which is the rotational angular speed around the center of gravity of the vehicle body 8, by the gyro sensor 3, and detects the rotational angle of the steering wheel or the steering angle of the wheel 7 caused by the steering of a driver who drives the vehicle 10 by the steering angle sensor 4.

Further, the vehicle motion state estimation apparatus 50 directly or indirectly gives a control output to the braking/driving control unit 5 and the steering control unit 6 based on the result of processing using the above-mentioned sensor. FIG. 1 illustrates an example of a configuration in which the control output is directly given, and in the case of indirectly performing the control output, for example, it can be performed via a higher-level controller.

The braking/driving control unit 5 is a unit that controls braking/driving generated by an internal combustion engine, an electric motor, a brake caliper, or the like based on a driver's operation, an output of the vehicle motion state estimation apparatus 50, and the like. Further, the steering control unit 6 is a unit that controls the steering angle of the wheel 7 based on a driver's operation, the output of the vehicle motion state estimation apparatus 50, and the like.

Here, the braking/driving control unit 5, or the steering control unit 6, or both of them may include a plane motion estimation unit for estimating and outputting a plane motion state quantity such as a slip ratio as a wheel slip in the front-rear direction of the wheel 7 and a lateral slip angle as a wheel slip in a lateral direction based on input values detected by the aforementioned sensors (the wheel speed sensor 1, the acceleration sensor 2, the gyro sensor 3, and the steering angle sensor 4).

Further, the vehicle 10 may include a higher-level controller that transmits a control command or an estimated value to the braking/driving control unit 5 or the steering control unit 6. The higher-level controller may be configured to input a vertical motion state quantity which is an output of the vehicle motion state estimation apparatus 50 to generate a control command or an estimated value.

Hereinafter, the values detected by the above-described sensors (the wheel speed sensor 1, the acceleration sensor 2, the gyro sensor 3, and the steering angle sensor 4) and the values estimated and output by the braking/driving control unit 5 or the steering control unit 6, or both are called as traveling state information.

The vehicle motion state estimation apparatus 50 receives the above-mentioned traveling state information as an input, estimates the vertical motion state quantity of the vehicle 10 such as a relative speed and a pitch rate, and outputs the result to the braking/driving control unit 5 and the like.

Next, a conceptual configuration example of the vehicle motion state estimation apparatus 50 mounted on the vehicle 10 of FIG. 1 will be described with reference to FIG. 2.

Figure 2:
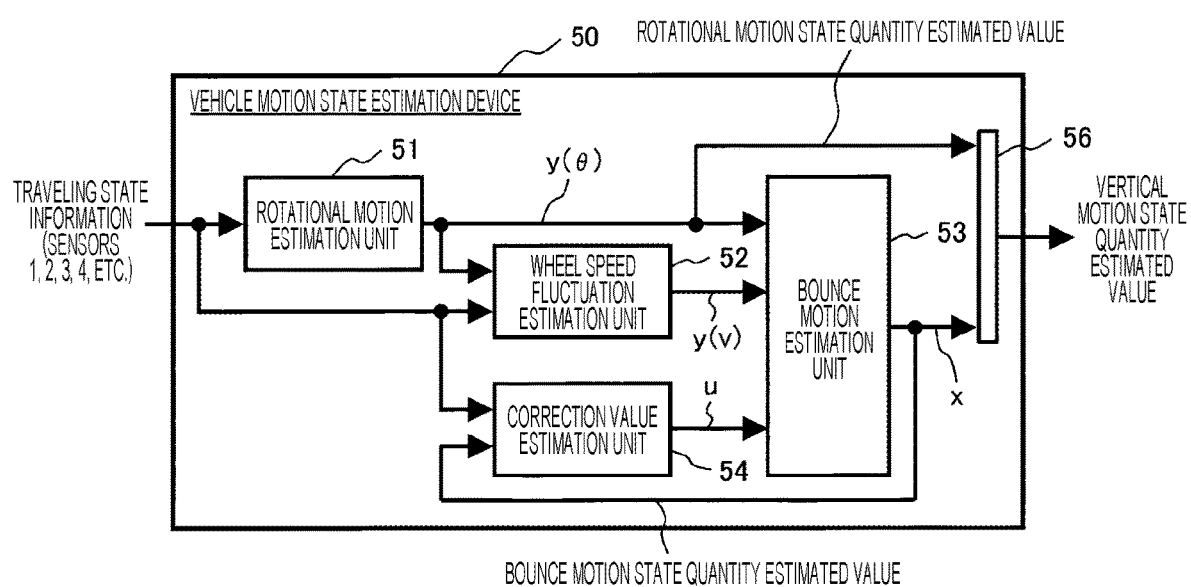
FIG. 2 is a diagram illustrating a conceptual configuration example of the vehicle motion state estimation apparatus 50 according to the first embodiment.

FIG. 2 is a conceptual diagram of a vehicle motion state estimation apparatus 50 that estimates and outputs a vertical motion state quantity such as a relative displacement and a relative speed based on the above-described traveling state information.

The vehicle motion state estimation apparatus 50, which receives the traveling state information (the outputs of the wheel speed sensor 1, the acceleration sensor 2, the gyro sensor 3, and the steering angle sensor 4, and the value estimated and output by the braking/driving control unit 5 or the steering control unit 6, or both), is configured by a rotational motion estimation unit 51 for estimating a rotational motion state quantity, a wheel speed fluctuation estimation unit 52 for estimating a wheel speed fluctuation caused by a vertical motion, a bounce motion estimation unit 53 for estimating a bounce motion state quantity, a correction value estimation unit 54 for estimating a correction value, and an output unit 56, and outputs the rotational motion state quantity and the bounce motion state quantity collectively. Hereinafter, this output is referred to as a vertical motion state quantity.

The rotational motion estimation unit 51 of the vehicle motion state estimation apparatus 50 receives the traveling state information as an input, estimates a roll angle θx and a pitch angle θy, which are rotational angles around the center of gravity of the vehicle body 8, and a roll rate θx/dt and a pitch rate θy/dt, which are the rotational angular speeds, based on a motion equation, a filter, and a gain, and outputs these values as the rotational motion state quantity estimated value y(θ).

Here, the rotational motion estimation unit 51 may be configured to be mounted in a unit connected to the vehicle motion state estimation apparatus 50 such as the braking/driving control unit 5 instead of being included in the vehicle motion state estimation apparatus 50 and input the estimated rotational motion state estimated value to the vehicle motion state estimation apparatus 50. There is no limitation in a method for acquiring the rotational motion state quantity estimated value in the vehicle motion state estimation apparatus 50.

The wheel speed fluctuation estimation unit 52 of the vehicle motion state estimation apparatus 50 receives the traveling state information and the rotational motion state quantity estimated value y(θ) as inputs, estimates the wheel speed fluctuation caused by the vertical motion generated by the road surface vertical displacement and the vertical motion of the vehicle, and outputs a wheel speed fluctuation estimated value y(V).

The bounce motion estimation unit 53 receives the traveling state information, the rotational motion state quantity estimated value y(θ), the wheel speed fluctuation estimated value y(V) caused by the vertical motion, and a correction value u described later, estimates the bounce motion state quantity such as the relative displacement and the relative speed, and outputs a bounce motion state quantity estimated value x.

The correction value estimation unit 54 receives the traveling state information and the bounce motion state quantity estimated value x, and estimates and outputs the correction value u.

Hereinafter, the wheel speed fluctuation estimation unit 52, the bounce motion estimation unit 53, and the correction value estimation unit 54 will be described in more detail.

Figure 3:
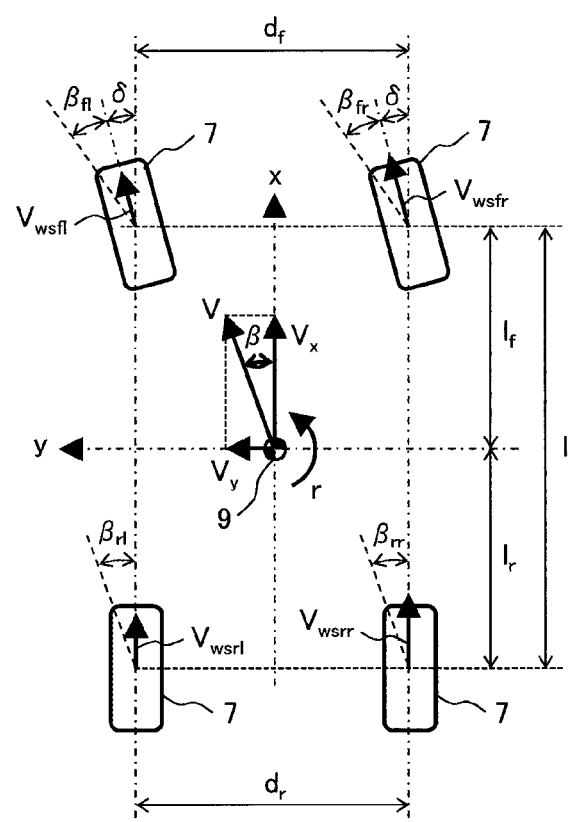
FIG. 3 is a diagram illustrating a four-wheel vehicle plane model according to the first embodiment.

First, a specific example of a method for estimating the wheel speed fluctuation estimated value y(V) caused by the vertical motion in the wheel speed fluctuation estimation unit 52 will be described with reference to FIG. 3. FIG. 3 is a diagram illustrating a four-wheel vehicle plane model.

In the first embodiment, for the four-wheel vehicle plane model, a sprung center 9 of gravity is set as the origin, the front-rear direction of the vehicle is set as an x-axis, the left-right direction of the vehicle is set as a y-axis, and the vertical direction of the vehicle is set as a z-axis.

FIG. 3 illustrates the motion of a four-wheel vehicle with front wheel steering during turning.

Here, the actual steering angle which is the steering angle of the wheel 7 is δ, the speed in the traveling direction of the vehicle is V, the speed in the front-rear direction of the vehicle is Vx, the speed in the left-right direction of the vehicle is Vy, the yaw rate, which is the rotational angular speed around the z-axis detected by the gyro sensor 3, is r, the angle between the traveling direction and the front-rear direction of the vehicle is a body slip angle β, the angles between the traveling direction of the wheels 7 and the rotating surface is wheel lateral slip angles βfl, βfr, βrl, and β*rr*, the wheel speeds detected by the wheel speed sensor 1 are Vwsfl, Vwsfr, Vwsrl, and Vwsrr, a wheel base, which is the distance between the front and rear axles, is l, the distances in the longitudinal direction of the vehicle from the front and rear axles to the sprung center of gravity are lf and lr, and the treads of the front and rear wheels are df and dr.

In the above symbol display, the subscript f indicates a front wheel, r indicates a rear wheel, fl indicates a left front wheel, fr indicates a right rear wheel, rl indicates a left rear wheel, and rr indicates a right rear wheel.

Using FIG. 3, the wheel speed fluctuation caused by the vertical motion estimated by the wheel speed fluctuation estimation unit 52 is expressed by the following Expression (1).

[Math. 1]

$$\begin{cases} V_{zfl} = V_{wxfl} - V_x \\ \quad = \left(\dfrac{V_{wsfl}}{\cos \beta_{fl}}\cos\delta + \dfrac{1}{2}d_f r\right) - \int \{(G_x - g\sin\theta_y)\cos\beta + \\ \quad\quad (G_y - g\cos\theta_x)\sin\beta\}dt \\ V_{zfr} = V_{wxfr} - V_x \\ \quad = \left(\dfrac{V_{wxfr}}{\cos \beta_{fr}}\cos\delta - \dfrac{1}{2}d_f r\right) - \int \{(G_x - g\sin\theta_y)\cos\beta + \\ \quad\quad (G_y - g\cos\theta_x)\sin\beta\}dt \\ V_{zrl} = V_{wxrl} - V_x \\ \quad = \left(\dfrac{V_{wsrl}}{\cos \beta_{rl}} + \dfrac{1}{2}d_r r\right) - \int \{(G_x - g\sin\theta_y)\cos\beta + \\ \quad\quad (G_y - g\cos\theta_x)\sin\beta\}dt \\ V_{zrr} = V_{wxrr} - V_x \\ \quad = \left(\dfrac{V_{wxrr}}{\cos \beta_{rr}} - \dfrac{1}{2}d_r r\right) - \int \{(G_x - g\sin\theta_y)\cos\beta + \\ \quad\quad (G_y - g\cos\theta_x)\sin\beta\}dt \end{cases} \quad (1)$$

Here, Vzfl, Vzfr, Vzrl, and Vzrr in Expression (1) are wheel speed fluctuations caused by vertical motion, Vwxfl, Vwxfr, Vwxrl, and Vwxrr are wheel speeds calculated as sprung center of gravity positions, and Gx and Gy are the longitudinal acceleration and the lateral acceleration acting on the center of gravity of the vehicle body 8 detected by the acceleration sensor 2, g is a gravitational acceleration, and θx and θy are the roll angle and the pitch angle estimated by the rotational motion estimation unit 51.

In addition, the longitudinal speed Vx of the vehicle in Expression (1) may be a plane motion state quantity estimated by a controller such as the above-mentioned steering control unit 6, a value calculated by temporally differentiating the position information detected by using a GPS, or a plane motion state quantity estimated by the plane motion estimation unit (not illustrated) provided in the vehicle motion state estimation apparatus 50. A method for acquiring the speed Vx in the front-rear direction of the vehicle is not limited.

In addition, the wheel lateral slip angles βfl, βfr, βrl, and βrr of Expression (1) may be values calculated based on the plane motion state quantity estimated by a controller such as the steering control unit 6 and the body slip angle β detected using a GPS, or may be the plane motion state quantities estimated by the plane motion estimation unit (not illustrated) provided in the vehicle motion state estimation apparatus 50. The method for acquiring the wheel lateral slip angles βfl, βfr, βrl, and βrr is not limited.

Further, the roll angle θx and the pitch angle θy in Expression (1) may be values estimated by a controller such as the steering control unit 6 or values detected using a stereo camera or the like. The method for acquiring the roll angle θx and the pitch angle θy is not limited.

From the above, the wheel speed fluctuation estimation unit 52 receives the wheel speeds Vwsfl, Vwsfr, Vwsrl, and Vwsrr detected by the wheel speed sensor 1 that are the traveling state information, and the yaw rate r that is the rotational angular speed around the z-axis detected by the gyro sensor 3, and estimates and outputs the wheel speed fluctuations Vzfl, Vzfr, Vzrl, and Vzrr caused by the vertical motion. Further, in this specification and in FIG. 2 and the like, the estimated wheel speed fluctuations Vzfl, Vzfr, Vzrl, and Vzrr caused by vertical motion may be collectively referred to as the wheel speed fluctuation estimated value y(V).

Next, a specific example of the method for estimating a bounce motion state quantity x in the bounce motion estimation unit 53 of FIG. 2 and the method for estimating the correction value u in the correction value estimation unit 54 will be described with reference to FIGS. 4 to 9.

In the bounce motion estimation unit 53, the detected or estimated observation quantity is set as an output vector y, and the bounce motion state quantity is set as a state vector x, and the vehicle motion is converted into a state equation. Using an observer based on the state equation, the state vector x is estimated and output from the output vector y and the input vector u.

Therefore, it is necessary to derive a state equation as expressed by the following Expression (2).

[Math. 2]

$$\begin{cases} \dot{x} = Ax + Bu + Gv \\ y = Cx + Du + Hw \end{cases} \quad (2)$$

Hereinafter, the derivation of the state equation of Expression (2) will be described.

Figure 4:
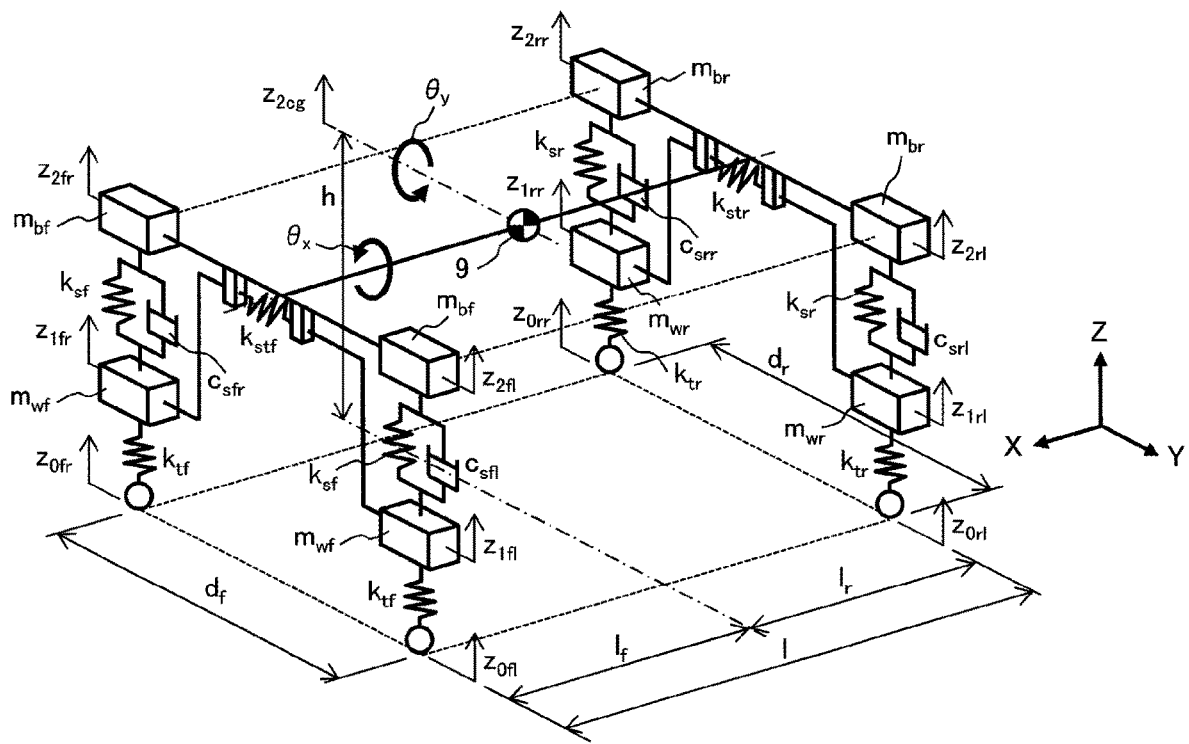
FIG. 4 is a diagram illustrating a four-wheel full vehicle model according to the first embodiment.

FIG. 4 is a diagram illustrating a four-wheel full vehicle model. FIG. 4 illustrates the movement of a four-wheeled vehicle accompanied by road surface vertical displacement. The notation in FIG. 4 and the like are based on the example of the four-wheel vehicle plane model in FIG. 3.

Then, in the four-wheel full vehicle model of FIG. 4, the sprung masses are represented as mbf and mbr, the unsprung masses are represented as mwf and mwr, the sprung vertical displacements are represented as z2fl, z2fr, z2rl, and z2rr, and the unsprung vertical displacements are represented as z1fl, z1fr, z1rl, and zlrr, the road surface vertical displacements are represented as z0fl, z0fr, z0rl, and z0rr, the roll angle and the pitch angle of sprung center 9 of gravity are respectively represented as θx and θy, the suspension spring constants are represented as ksf and ksr, the suspension damping coefficients are represented as csfl, csfr, csrl, and csrr, and the stabilizer spring constants are represented as kstf and kstr.

The vertical motion of the vehicle accompanied by the road surface vertical displacement is expressed by Expressions (3) to (7).

Expression (3) is the motion equation for the vertical force $F_s$ acting on the sprung, Expression (4) is the motion equation for the vertical force $F_s$ acting on the unsprung and $k_t(z)$, Expression (5) is the motion equation for a force in the vertical direction acting between the sprung and the unsprung, Expression (6) is the vertical relative displacement $z_{21}$ of the sprung and the unsprung, and Expression (7) is a relational equation between the roll angle θx, which is the rotational angle about the x-axis and the pitch angle θy, which is a rotational angle about the y-axis.

[Math. 3]

$$\begin{cases} m_{bf} \dfrac{d^2 z_{2fl}}{dt^2} = -F_{sfl} \\ m_{bf} \dfrac{d^2 z_{2fr}}{dt^2} = -F_{sfr} \\ m_{br} \dfrac{d^2 z_{2rl}}{dt^2} = -F_{srl} \\ m_{br} \dfrac{d^2 z_{2rr}}{dt^2} = -F_{srr} \end{cases} \quad (3)$$

[Math. 4]

$$\begin{cases} m_{wf} \dfrac{d^2 z_{1fl}}{dt^2} = F_{sfl} - k_{tf}(z_{1fl} - z_{0fl}) \\ m_{wf} \dfrac{d^2 z_{1fr}}{dt^2} = F_{sfr} - k_{tf}(z_{1fr} - z_{0fr}) \\ m_{wr} \dfrac{d^2 z_{1rl}}{dt^2} = F_{srl} - k_{tr}(z_{1rl} - z_{0rl}) \\ m_{wr} \dfrac{d^2 z_{1rr}}{dt^2} = F_{srr} - k_{tr}(z_{1rr} - z_{0rr}) \end{cases} \quad (4)$$

[Math. 5]

$$\begin{cases} F_{sfl} = k_{sf} z_{21fl} + c_{sfl} \dfrac{dz_{21fl}}{dt} + k_{stf}(z_{21fl} - z_{21fr}) \\ F_{sfr} = k_{xf} z_{21fr} + c_{sfr} \dfrac{dz_{21fr}}{dt} - k_{sfr}(z_{21fl} - z_{21fr}) \\ F_{srl} = k_{sr} z_{21rl} + c_{srl} \dfrac{dz_{21rl}}{dt} + k_{str}(z_{21rl} - z_{21rr}) \\ F_{srr} = k_{sr} z_{21rr} + c_{srr} \dfrac{dz_{21rr}}{dt} - k_{str}(z_{21rl} - z_{21rr}) \end{cases} \quad (5)$$

[Math. 6]

$$\begin{cases} z_{21fl} = z_{2fl} - z_{1fl} \\ z_{21fr} = z_{2fr} - z_{1fr} \\ z_{21rl} = z_{2rl} - z_{1rl} \\ z_{21rr} = z_{2rr} - z_{1rl} \end{cases} \quad (6)$$

[Math. 7]

$$\begin{cases} \theta_x = \dfrac{d_r(z_{2fl} - z_{2fr}) + d_f(z_{2rl} - z_{2rr})}{2 d_f d_r} \\ \theta_y = \dfrac{-(z_{2fl} + z_{2fr}) + (z_{2rl} + z_{2rr})}{2l} \end{cases} \quad (7)$$

Next, using FIGS. 5 to 9, the description will be given about a wheel speed fluctuation Vza which is estimated by the wheel speed fluctuation estimation unit 52 and caused by the vehicle body pitching, which constitutes the output wheel speed fluctuation Vz caused by the vertical motion, a wheel speed fluctuation Vzb caused by the suspension displacement, and a wheel speed fluctuation Vzc caused by the ground load fluctuation.

Further, in FIGS. 5 to 9, suffixes such as fl indicating the right and left wheels are omitted because they are common to each wheel.

First, a specific example of the wheel speed fluctuation Vza caused by vehicle body pitching will be described.

Figure 5:
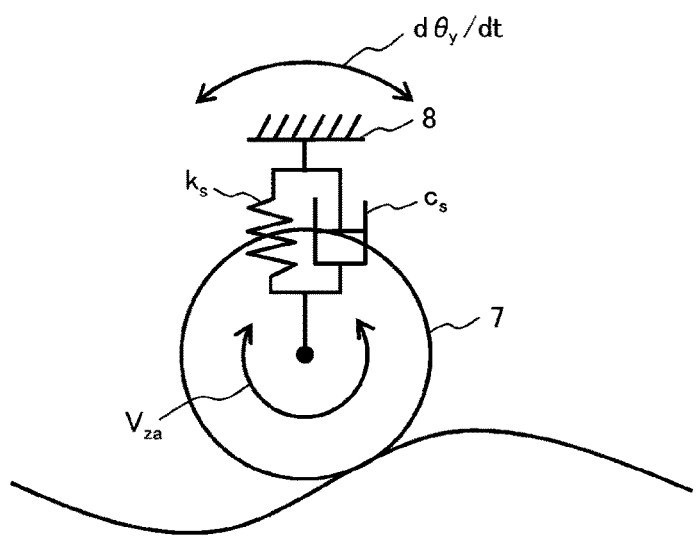
FIG. 5 is a diagram illustrating wheel speed fluctuations caused by vehicle body pitching according to the first embodiment.

FIG. 5 is a diagram illustrating wheel speed fluctuations generated by vehicle body pitching, and schematically illustrates a state in which wheel speed fluctuations Vza occur due to a relative angular speed of the vehicle body 8 and the wheels 7 generated while traveling on an undulating road or the like.

The wheel speed fluctuation Vza caused by the vehicle body pitching is represented by the following Expression (8), where dθx/dt is the pitch rate, which is the time derivative of the pitch angle θx, and h is the height of the sprung center 8 of gravity.

[Math. 8]

$$V_{za} = -h\frac{d\theta_y}{dt} \qquad (8)$$

Next, a specific example of the wheel speed fluctuation Vzb caused by suspension displacement will be described.

Figure 6:
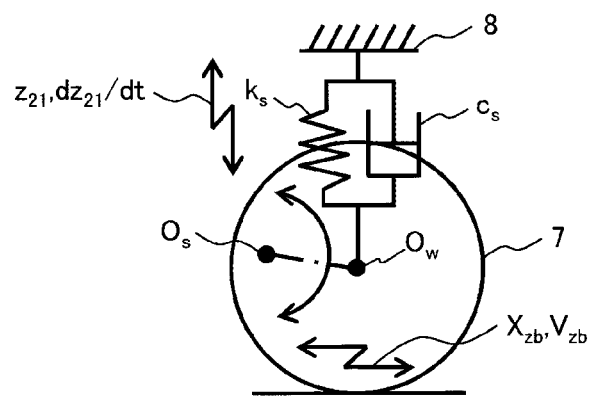
FIG. 6 is a diagram illustrating wheel speed fluctuations caused by displacement of the suspension according to the first embodiment.

FIG. 6 is a diagram illustrating wheel speed fluctuations caused by the displacement of the suspension, and schematically illustrates a state in which the center Ow of the wheel 7 is displaced around the instantaneous rotation center Os of the suspension along with the vertical relative displacement z21 of the vehicle body 8 and the wheel 7 during traveling on an undulating road or the like so as to generate a longitudinal displacement Xzb in the wheel 7.

Figure 7:
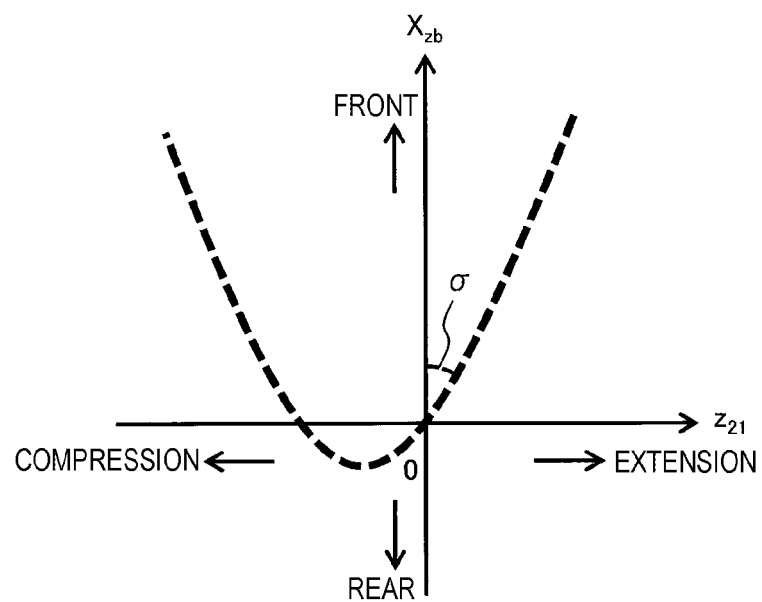
FIG. 7 is a diagram illustrating a linear relationship between relative displacement and longitudinal displacement according to the embodiment.

FIG. 7 is a characteristic diagram illustrating a relationship between the vertical relative displacement z21 of the vehicle body 8 and the wheel 7 in FIG. 6 and the longitudinal displacement Xzb of the wheel 7.

Here, FIG. 7 is a characteristic diagram with the origin when the vehicle 10 is stationary on the horizontal plane, and σ illustrated in FIG. 7 is a linear approximation gradient at the origin of the characteristic diagram.

A wheel speed fluctuation Vzb1 caused by suspension displacement, which is the time derivative of the longitudinal displacement Xzb of the wheel 7, is the relative speed dz21/dt, which is the time derivative of the vertical relative displacement z21 of the vehicle body 8 and the wheel 7 in the vertical direction, and is expressed by the following Expression (9).

[Math. 9]

$$V_{zb1} = \sigma\frac{dz_{21}}{dt} \qquad (9)$$

Since Expression (9) uses the above-described linear approximation gradient σ, Vzb and Vzb1 are equal within a linearly approximation range.

On the other hand, in a region where the longitudinal displacement Xzb of the wheel 7 and the vertical relative displacement z21 of the vehicle body 8 and the wheel 7 illustrated in FIG. 7 are large, there is a problem that the estimation accuracy is deteriorated in Expression (9).

Therefore, in the invention, the above-described problem is solved by using the bounce motion state quantity estimated value x as an input in the correction value estimation unit 54, estimating and outputting a correction value based on this non-linear characteristic, and inputting the value to the bounce motion estimation unit 53.

A specific example of a method for estimating the correction value in the correction value estimation unit 54 of FIG. 2 will be described.

As an example, the characteristic diagram illustrated in FIG. 7 can be approximated by a quadratic function represented by the following Expression (10).

Here, α1 is a quadratic coefficient of the vertical relative displacement z21 between the vehicle body 8 and the wheel 7, α2 is a primary coefficient of the vertical relative displacement z21 of the vehicle body 8 and the wheel 7, α3 is the intercept, and z2lo is the relative displacement when the vehicle 10 is stationary on a horizontal plane.

In the first embodiment, the approximation is performed using a quadratic function. However, the approximation may be performed using a function of third or higher order, and the method for approximating the characteristic diagram is not limited.

[Math. 10]

$$X_{zb} = \alpha_1(z_{21}-z_{21o})^2 + \alpha_2(z_{21}-z_{21o}) + \alpha_3 \qquad (10)$$

Since the correction target is a speed term, the wheel speed fluctuation Vzb2 caused by suspension displacement obtained by time-differentiating Expression (10) is expressed by the following Expression (11).

[Math. 11]

$$V_{zb2} = 2\alpha_1(z_{21}-z_{21o})\frac{dz_{21}}{dt} + \alpha_2\frac{dz_{21}}{dt} \qquad (11)$$

Based on the above Expressions (9) and (11), the changes Vzbdfl, Vzbdfr, Vzbdrl, and Vzbdrr of the wheel speed fluctuation caused by the suspension displacement estimated by the correction value estimation unit 54 are expressed by the following Expression (12).

[Math. 12]

$$\begin{cases} V_{zbdfl} = \left(2\alpha_{1f}(z_{21fl}-z_{21ofl})\frac{dz_{21fl}}{dt} + \alpha_{2f}\frac{dz_{21fl}}{dt}\right) - \sigma_f\frac{dz_{21fl}}{dt} \\ V_{zhdfc} = \left(2\alpha_{1f}(z_{21fr}-z_{21ofr})\frac{dz_{21fr}}{dt} + \alpha_{2f}\frac{dz_{21fr}}{dt}\right) - \sigma_f\frac{dz_{21fr}}{dt} \\ V_{zbdrl} = \left(2\alpha_{1r}(z_{21rl}-z_{21orl})\frac{dz_{21rl}}{dt} + \alpha_{2r}\frac{dz_{21rl}}{dt}\right) - \sigma_r\frac{dz_{21rl}}{dt} \\ V_{zhdrr} = \left(2\alpha_{1r}(z_{21rr}-z_{21orr})\frac{dz_{21rr}}{dt} + \alpha_{2r}\frac{dz_{21rr}}{dt}\right) - \sigma_r\frac{dz_{21rr}}{dt} \end{cases} \qquad (12)$$

Expression (12) is an equation assuming that the relationship between the relative displacement z21 and the longitudinal displacement Xzb is non-linear for both the front and rear suspensions. For example, when the front wheel side has a linear characteristic and the rear wheel side has a non-linear characteristic, Vzbdfl and Vzbdfr of Expression (12) are defined as 0 so that both linear characteristics and non-linear characteristics can be handled.

In addition, the non-linear component of the wheel speed fluctuation caused by the suspension displacement in Expression (12) may be calculated using a characteristic diagram or the like, and a method for calculating the non-linear component of the wheel speed fluctuation caused by the suspension displacement is not limited.

Further, the method may be a method in which the linear approximation gradient σ used in Expression (12) may be set to 0, the correction value estimation unit 54 estimates and outputs the wheel speed fluctuation Vzb caused by suspension displacement, and outputs the same to the bounce motion estimation unit 53.

Further, the relative displacements z21ofl, z21ofr, z21orl, and z21orr of Expression (12) when the vehicle 10 is stationary on a horizontal plane change caused by an increase or decrease in the number of occupants or an increase or decrease in mass accompanying the loading of luggage.

Therefore, in order to realize highly accurate estimation of the bounce motion state quantity, the relative displacements z21ofl, z21ofr, z21orl, and z21orr when the vehicle 10 is stationary on a horizontal plane are desirably estimated from detection values of an external recognition sensor such as a stereo camera and the acceleration sensor 2.

Further, on the assumption that the relative displacements z21ofl, z21ofr, z21orl, and z21orr of Expression (12) when the vehicle 10 is stationary on a horizontal plane are set to 0, it is desirable to use the quadratic coefficient α1 of z21, the primary coefficient α2 of z21, the intercept α3, and the linear approximation gradient σ under conditions such as mass that is used most frequently in order to realize the highly robust estimation of the bounce motion state quantity.

Expression (12) may be a map in which the relative displacements z21ofl, z21ofr, z21orl, and z21orr when the vehicle 10 is stationary on a horizontal plane, the vertical relative displacements z21fl, z21fr, z21rl, and z21rr of the vehicle body 8 and the wheel 7, and the time derivatives dz21fl/dt, dz21fr/dt, dz21rl/dt, and dz21rr/dt of the relative displacement of the vehicle body 8 and the wheel 7 in the vertical direction are input and the relative displacements z21ofl, z21ofr, z21orl, and z21orr when the vehicle 10 is stationary on a horizontal plane and the changes Vzbdfl, Vzbdfr, Vzbdrl, and Vzbdrr of the wheel speed fluctuation caused by the suspension displacement are output. The method for estimating the changes Vzbdfl, Vzbdfr, Vzbdrl, and Vzbdrr of the wheel speed fluctuation caused by the suspension displacement is not limited.

Next, a specific example of the wheel speed fluctuation Vzc caused by the ground load fluctuation will be described.

Figure 8:
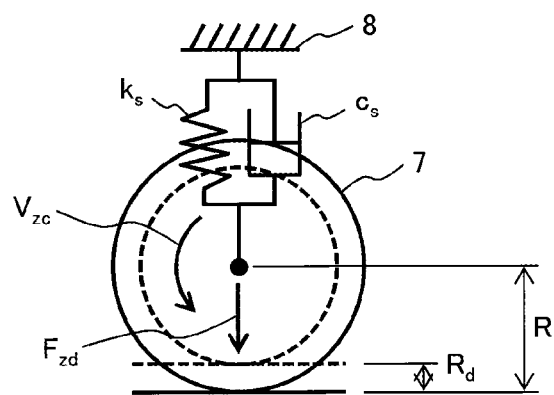
FIG. 8 is a diagram illustrating wheel speed fluctuations caused by ground load fluctuations according to the embodiment.

FIG. 8 is a diagram schematically illustrating the wheel speed fluctuation caused by the ground load fluctuation, in which a tire effective turning radius R decreases with the increase of the ground load fluctuation Fzd acting on the wheel 7, thereby increasing the wheel speed fluctuation Vzc.

Figure 9:
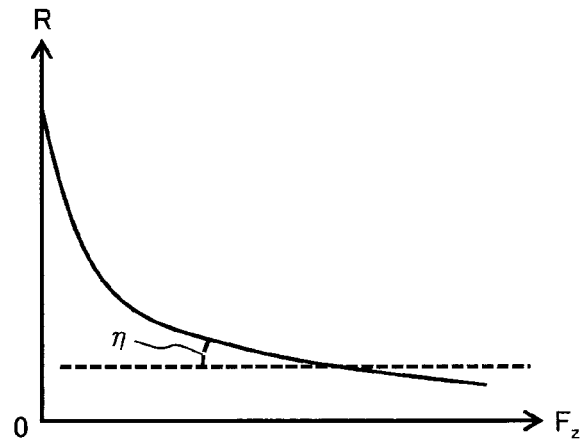
FIG. 9 is a diagram illustrating a relationship between a ground load and a tire effective turning radius according to the embodiment.

FIG. 9 is a characteristic diagram illustrating the relationship between the ground load Fz and the tire effective turning radius R.

The wheel speed fluctuation Vzc caused by the ground load fluctuation is represented by the following Expression (13) in which a linear approximation gradient of the characteristic diagram illustrated in FIG. 9 is η, a change of the tire effective turning radius is Rd, a tire vertical spring constant is kt, a wheel speed is Vwx, the unsprung vertical displacement is z1, and the road surface vertical displacement is z0.

Here, the method for deriving the amount of change Rd of the tire effective turning radius using the linear approximation gradient η of Expression (13) is an example, and the characteristic diagram illustrated in FIG. 9 or an approximate expression of the characteristic diagram may be used. The method for deriving the change in the tire effective turning radius is not limited.

[Math. 13]

$$V_{zc} = \frac{V_{wx}}{R} R_d = \frac{\eta V_{wx}}{k_t R} F_{zd} = \frac{\eta V_{wx}}{R}(z_0 - z_1) \quad (13)$$

Using the wheel speed fluctuations expressed by the above Expressions (8) to (13) and the change in the wheel speed fluctuations caused by the suspension displacement, the wheel speed fluctuations Vzfl, Vzfr, Vzrl, and Vzrr caused by the vertical motion are expressed by the following Expression (14).

[Math. 14]

$$\begin{cases} V_{sfl} = V_{zajl} + V_{sbfl} + V_{sbdfl} + V_{scfl} = -h\frac{d\theta_y}{dt} + \sigma_f \frac{dz_{21fl}}{dt} + \\ \qquad V_{zbdfl} + \frac{\eta V_{wxjl}}{R}(z_{0fl} - z_{1fl}) \\ V_{sfr} = V_{szdfr} + V_{sbfr} + V_{sbdfr} + V_{zcfr} = -h\frac{d\theta_y}{dt} + \sigma_f \frac{dz_{21fr}}{dt} + \\ \qquad V_{zbdfr} + \frac{\eta V_{wxfr}}{R}(z_{0fr} - z_{1fr}) \\ V_{srl} = V_{zorl} + V_{zbrl} + V_{zbdrl} + V_{zcrl} = -h\frac{d\theta_y}{dt} + \sigma_r \frac{dz_{21rl}}{dt} + \\ \qquad V_{zbdrl} + \frac{\eta V_{wxrl}}{R}(z_{0rl} - z_{1rl}) \\ V_{zrr} = V_{zarr} + V_{zbrr} + V_{zbdrr} + V_{scrr} = -h\frac{d\theta_y}{dt} + \sigma_r \frac{dz_{21rr}}{dt} + \\ \qquad V_{zbdrr} + \frac{\eta V_{wxrr}}{R}(z_{0rr} - z_{1rr}) \end{cases} \quad (14)$$

Here, since the wheel speeds Vwxfl, Vwxfr, Vwxrl, and Vwrr change every moment, when the bounce motion estimation unit 53 is a linear observer configured with a time-invariant constant described later, it is necessary to consider the fluctuation of the wheel speed.

The following Expression (15) shows that the wheel speed fluctuations Vzcfl, Vzcfr, Vzcrl, and Vzcrr caused by the ground load fluctuation in Expression (14) are separated into the term of the wheel speed fluctuation caused by the ground load fluctuation by the steady wheel speed Vws and the term of the changes Vzcdfl, Vzcdfr, Vzcdrl, and Vzcdrr in the wheel speed fluctuation caused by the ground load fluctuation.

[Math. 15]

$$\begin{cases} V_{zcfl} = \frac{\eta V_{ws}}{R}(z_{0fl} - z_{1fl}) + \frac{\eta(V_{wfxl} - V_{ws})}{R}(z_{0fl} - z_{1fl}) = \\ \qquad \frac{\eta V_{ws}}{R}(z_{0fl} - z_{1fl}) + V_{zcdfl} \\ V_{zcfr} = \frac{\eta V_{ws}}{R}(z_{0fr} - z_{1fr}) + \frac{\eta(V_{wxfr} - V_{ws})}{R}(z_{0fr} - z_{1fr}) = \\ \qquad \frac{\eta V_{ws}}{R}(z_{0fr} - z_{1fr}) + V_{zcdfr} \\ V_{zcrl} = \frac{\eta V_{ws}}{R}(z_{0rl} - z_{1rl}) + \frac{\eta(V_{wxrl} - V_{ws})}{R}(z_{0rl} - z_{1rl}) = \\ \qquad \frac{\eta V_{ws}}{R}(z_{0rl} - z_{1rl}) + V_{zcdrl} \\ V_{zcrr} = \frac{\eta V_{wx}}{R}(z_{0rr} - z_{1rr}) + \frac{\eta(V_{wxrr} - V_{ws})}{R}(z_{0rr} - z_{1rr}) = \\ \qquad \frac{\eta V_{ws}}{R}(z_{0rr} - z_{1rr}) + V_{zcdrr} \end{cases} \quad (15)$$

That is, the correction value estimation unit 54 receives the estimated value of the bounce motion state quantity such as the relative displacement z21 and the relative speed dz21/dt, estimates the changes Vzbdfl, Vzbdfr, Vzbdrl, and Vzbdrr of the wheel speed fluctuation caused by the suspension displacement and the changes Vzcdfl, Vzcdfr, Vzcdrl, and Vzcdrr of the wheel speed fluctuation caused by the ground load fluctuation illustrated in Expression (15) based on Expressions (12) and (15), and outputs these values as the correction value estimated value u.

Among the elements of the state equation illustrated in the above Expression (2), the state vector x, the output vector y, and the input vector u are expressed by the following Expression (16).

The input vector u is configured by the changes Vzbdfl, Vzbdfr, Vzbdrl, and Vzbdrr of the wheel speed fluctuation caused by the suspension displacement, which is the output of the correction value estimation unit 54, and the changes Vzcdfl, Vzcdfr, Vzcdrl, and Vzcdrr of the wheel speed fluctuation caused by the ground load fluctuation illustrated in Expression (14).

[Math. 16]

$$\begin{cases} x = [z_{1fl}\ z_{1fr}\ z_{1rl}\ z_{1rr}\ z_{2fl}\ z_{2fr}\ z_{2rl}\ z_{2rr}\ \cdots \\ \quad \dfrac{dz_{1fl}}{dt}\ \dfrac{dz_{1fr}}{dt}\ \dfrac{dz_{1rl}}{dt}\ \dfrac{dz_{1rr}}{dt}\ \dfrac{dz_{2fl}}{dt}\ \dfrac{dz_{2fr}}{dt}\ \dfrac{dz_{2rl}}{dt}\ \dfrac{dz_{2rr}}{dt} ]^T \\ y = \left[ V_{zfl}\ V_{zfr}\ V_{zrl}\ V_{zrr}\ \theta_x\ \theta_y\ \dfrac{d\theta_x}{dt}\ \dfrac{d\theta_y}{dt} \right]^T \\ u = [V_{zbdfl}\ V_{zbdfr}\ V_{zbdrl}\ V_{zbdrr}\ V_{zcdfl}\ V_{zcdfr}\ V_{zcdrl}\ V_{zcdrr}]^T \end{cases} \quad (16)$$

According to Expression (16), the state vector x is an estimated value of the bounce motion state quantity in the vehicle motion state estimation device 50 in FIG. 2, and the term related to the inner wheel speed V of each term of the output vector y is the wheel speed fluctuation estimated value y(V) in the vehicle motion state estimation device 50 in FIG. 2, the term relating to the inner angle θ of each term of the output vector y is the rotational motion state quantity estimated value y(θ) in the vehicle motion state estimation device 50 in FIG. 2, and the input vector u is the correction value estimated value u in the vehicle motion state estimation device 50 of FIG. 2.

As a result, the state vector x, which is the bounce motion state quantity such as the relative displacement z21 and the relative speed dz21/dt, can be estimated with a low computational load using a linear observer that uses a state matrix A and an input matrix B as time-invariant constants. Further, details of the state matrix A and the input matrix B are omitted.

The above is an example of the method for estimating the vertical motion state quantity of the vehicle according to the invention. By using the vehicle motion state estimation apparatus 50 having such a configuration, it is possible to estimate the vertical motion state quantity using a general vehicle-mounted sensor such as a wheel speed sensor and a vehicle dynamics model even if the vehicle has a non-linear suspension characteristic.

Next, an example of a processing result of the vehicle motion state estimation apparatus 50 will be described with reference to FIG. 10.

Figure 10:
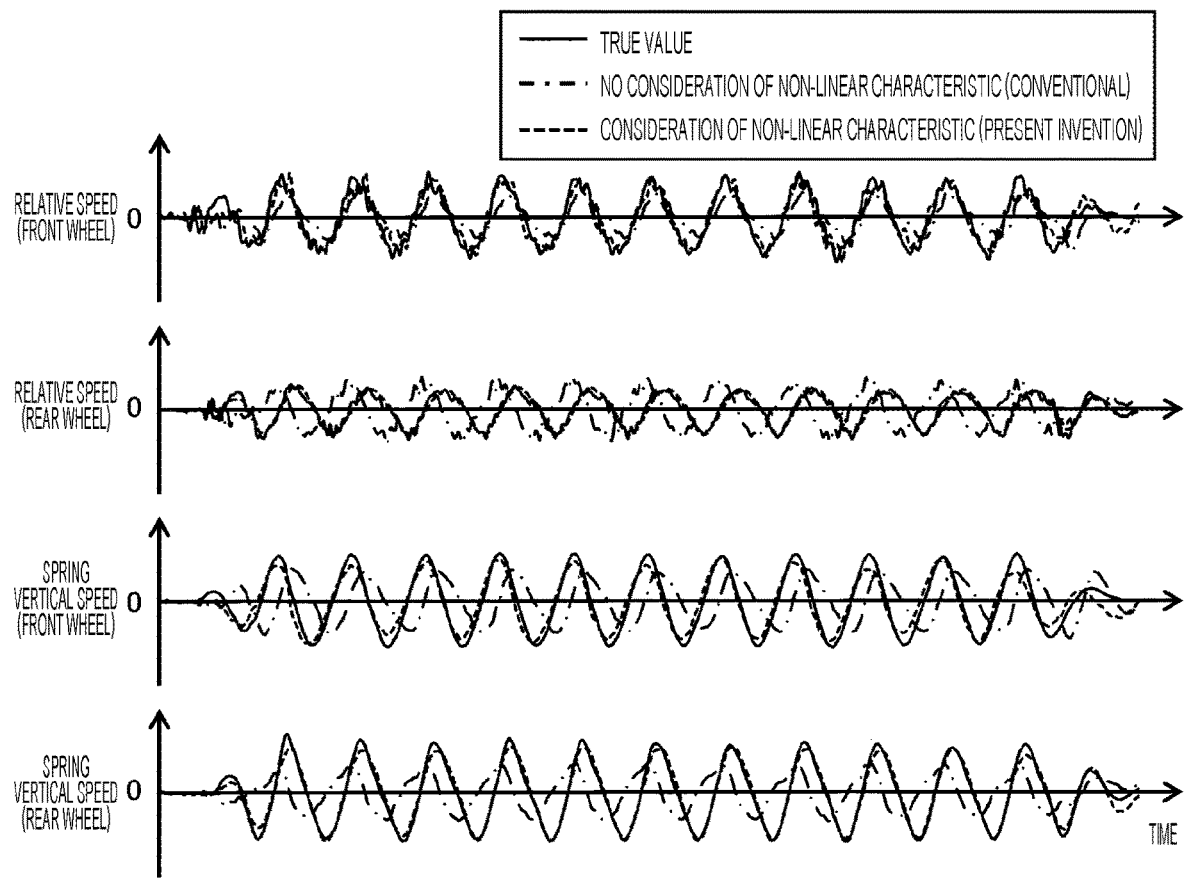
FIG. 10 is a diagram illustrating a temporal change of a processing result by the vehicle motion state estimation device 50 according to the first embodiment.

FIG. 10 is a diagram illustrating an example of a temporal change in the relative speed and the sprung vertical speed of the vehicle in which the relationship between the relative displacement z21 and the longitudinal displacement Xzb is non-linear.

The solid line illustrated in FIG. 10 is a true value detected and estimated using a dedicated sensor such as a vehicle height sensor or a vertical acceleration sensor, the dashed line is an estimated value obtained by a conventional method that does not consider the suspension non-linearity, and the broken line is an estimated value of the vehicle motion state estimation apparatus 50 of the invention in consideration of the suspension non-linearity.

As illustrated in FIG. 10, the estimated value obtained by the conventional method that does not consider the non-linearity has a relative speed mainly having a phase difference from the true value, and a sprung vertical speed having a large amplitude error and a large phase difference from the true value.

On the other hand, the estimated value of the invention in consideration of the non-linearity is substantially equal to the true value in both the relative speed and the sprung vertical speed, and can be estimated with higher accuracy than the conventional method.

Further, the processing result illustrated in FIG. 10 is a result obtained by processing using an update cycle of the traveling state information input to the vehicle motion state estimation apparatus 50 using a value of 20 ms. If the traveling state information of a shorter update period can be acquired, the shorter the update period of the traveling state information, the vertical motion state quantity in a higher frequency band can be estimated with more accuracy.

Second Embodiment

In the second embodiment, differences from the first embodiment will be mainly described, and description of the same parts as the first embodiment will be omitted.

The main difference between the second embodiment and the first embodiment is that the rotational motion estimation unit 51 and the bounce motion estimation unit 53 of the first embodiment form a vehicle motion state estimation apparatus 50 in which a vertical motion estimation unit 55 is integrated. A processing outline of the vertical motion estimation unit 55 will be mainly described with reference to FIG. 11.

Figure 11:
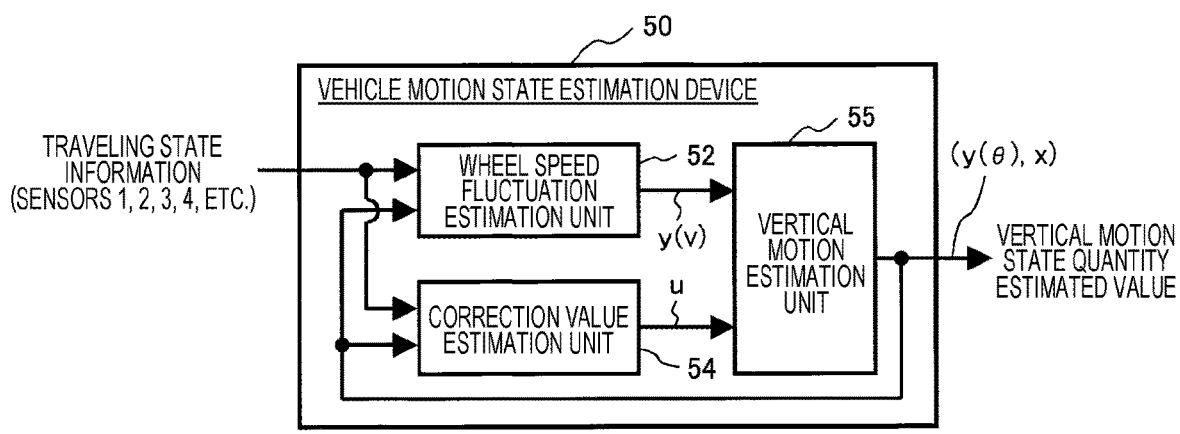
FIG. 11 is a diagram illustrating a conceptual configuration example of the vehicle motion state estimation apparatus 50 according to a second embodiment.

FIG. 11 is a conceptual diagram of a vehicle motion state estimation apparatus 50 that estimates and outputs a vertical motion state quantity such as a relative speed or a pitch angle based on traveling state information detected or estimated by the wheel speed sensor 1 or the acceleration sensor 2 described above.

The vehicle motion state estimation apparatus 50 includes the wheel speed fluctuation estimation unit 52, the correction value estimation unit 54, and the vertical motion estimation unit 55.

The wheel speed fluctuation estimation unit 52 receives the traveling state information and a vertical motion state quantity estimated value (y(θ), x) described below, estimates the wheel speed fluctuation caused by the vertical motion generated by the road surface vertical displacement and the vertical motion of the vehicle, and outputs the wheel speed fluctuation estimated value y(V).

The correction value estimation unit 54 receives the traveling state information and the vertical motion state quantity estimated value (y(θ), x) described later, and estimates and outputs the correction value u.

The vertical motion estimation unit 55 receives the traveling state information, the wheel speed fluctuation y(V) caused by the vertical motion, and the correction value u as inputs, and estimates and outputs the vertical motion state quantity (y(θ), x) such as the relative speed and the pitch angle.

The vertical motion estimation unit 55 is the same observer as the bounce motion estimation unit 53 included in the vehicle motion state estimation apparatus 50 of the first embodiment. When estimating the vertical motion state quantity, it is necessary to consider the motion equation relating to the roll moment around the x-axis of the vehicle body 8 and the pitch moment around the y-axis expressed by the following Expression (17).

[Math. 17]

$$\begin{cases} I_x \dfrac{d^2\theta_x}{dt^2} = \dfrac{d_f}{2}(-F_{sfl} + F_{sfr}) + \dfrac{d_r}{2}(-F_{srl} + F_{srr}) \\ I_y \dfrac{d^2\theta_y}{dt^2} = l_f(F_{sfl} + F_{sfr}) - l_r(F_{srl} + F_{srr}) \end{cases} \quad (17)$$

Here, Ix is a roll inertia moment, and Iy is a pitch inertia moment.

Further, among the elements of the state equation, the state vector x, the output vector y, and the input vector u are changed from Expression (16) of the first embodiment to the following Expression (18).

[Math. 18]

$$\begin{cases} x = [z_{1fl}\ z_{1fr}\ z_{1rl}\ z_{1rr}\ z_{2fl}\ z_{2fr}\ z_{2rl}\ z_{2rr}\ \cdots \\ \quad \dfrac{dz_{1fl}}{dt}\ \dfrac{dz_{1fr}}{dt}\ \dfrac{dz_{1rl}}{dt}\ \dfrac{dz_{1rr}}{dt}\ \dfrac{dz_{2fl}}{dt}\ \dfrac{dz_{2fr}}{dt}\ \dfrac{dz_{2rl}}{dt}\ \dfrac{dz_{2rr}}{dt}\ \theta_x\ \theta_y\ \dfrac{d\theta_x}{dt}\ \dfrac{d\theta_y}{dt} ]^T \\ y = [V_{zfl}\ V_{zfr}\ V_{zrl}\ V_{zrr}]^T \\ u = [V_{zbdfl}\ V_{zbdfr}\ V_{zbdrl}\ V_{zbdrr}\ V_{zcdfl}\ V_{zcdfr}\ V_{zcdrl}\ V_{zcdrr}]^T \end{cases} \quad (18)$$

By using the vertical motion estimation unit 55 having the above configuration, the computational load of the vehicle motion state estimation apparatus 50 can be reduced, and the motion state of the vehicle can be estimated with a less expensive computer.

Third Embodiment

In the third embodiment, differences from the first and second embodiments will be mainly described, and description of the same parts as the first and second embodiments will be omitted.

The main difference between the third embodiment and the first and second embodiments is that the vehicle 10 is configured by adding a suspension control unit 81 and a control suspension device 82. A processing outline of the suspension control unit 81 according to the third embodiment will be described using FIGS. 12 to 14.

Figure 12:
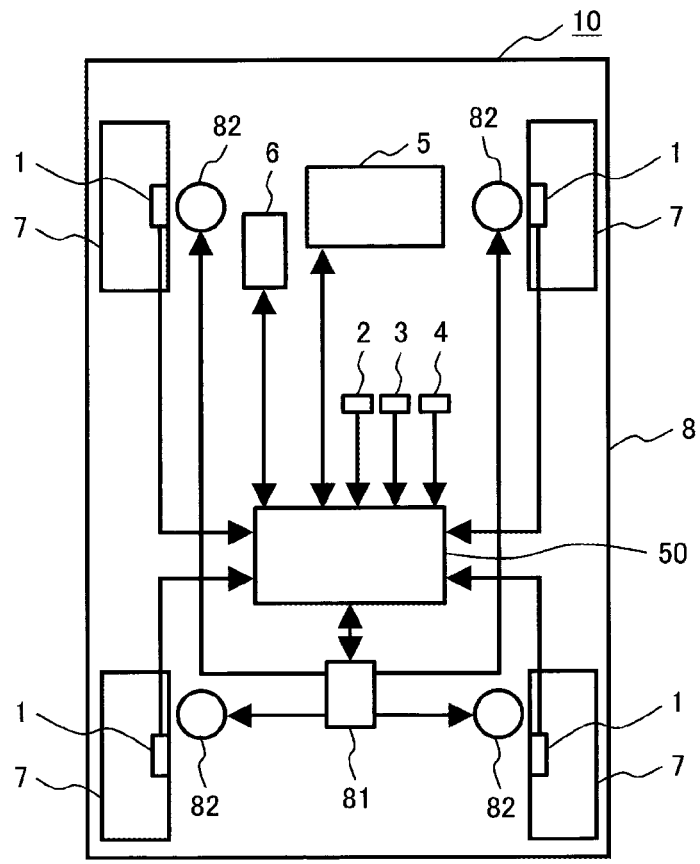
FIG. 12 is a diagram illustrating an example of a vehicle configuration equipped with the vehicle motion state estimation apparatus 50 according to a third embodiment.

FIG. 12 illustrates a configuration diagram of the vehicle 10 equipped with the vehicle motion state estimation apparatus 50 according to the third embodiment.

FIG. 12 illustrates a configuration in which the suspension control unit 81 and a control suspension device 82 are added to FIG. 1.

The control suspension device 82 is a shock absorber of a damping force adjustment type capable of adjusting a damping characteristic, or an active suspension capable of adjusting a vertical force between the vehicle body and wheels.

The suspension control unit 81 generates a control command value for controlling the damping characteristic of the control suspension device 82 or the vertical force based on the detection value such as the acceleration sensor 2 and the gyro sensor 3 and the estimated values such as the sprung vertical speed estimated by the vehicle motion state estimation apparatus 50.

Here, when the vehicle motion state estimation apparatus 50 is applied to the control suspension device 82, the suspension damping coefficients csfl, csfr, csrl, and csrr are variable, so that the bounce motion estimation unit 53 is a linear observer configured with a time-invariant constant. In this case, it is necessary to consider a change in the damping force.

The term of the damping force by the suspension damping coefficient of Expression (4) of the first embodiment is divided into the terms of the damping forces by steady damping coefficients csf and csr, and the terms of damping force changes Fcdfl, Fcdfr, Fcdrl, and Fcdrr generated by the difference, and expressed by the following Expression (19).

[Math. 19]

$$\begin{cases} F_{sfl} = k_{sf}z_{21fl} + c_{sf}\dfrac{dz_{21fl}}{dt} + (c_{sfl} - c_{xf})\dfrac{dz_{21fl}}{dt} + k_{stf}(z_{21fl} - z_{21fr}) \\ \qquad = k_{xf}z_{21fl} + c_{sf}\dfrac{dz_{21fl}}{dt} + F_{cdfl} + k_{stf}(z_{21fl} - z_{21fr}) \\ F_{sfr} = k_{sf}z_{21fr} + c_{sf}\dfrac{dz_{21fr}}{dt} + (c_{sfr} - c_{sf})\dfrac{dz_{21fr}}{dt} - k_{stf}(z_{21fl} - z_{21fr}) \\ \qquad = k_{sf}z_{21fr} + c_{sf}\dfrac{dz_{21fr}}{dt} + F_{cdfr} - k_{stf}(z_{21fl} - z_{21fr}) \\ F_{srl} = k_{sr}z_{21rl} + c_{sr}\dfrac{dz_{21rl}}{dt} + (c_{srl} - c_{sf})\dfrac{dz_{21rl}}{dt} + k_{str}(z_{21rl} - z_{21rr}) \\ \qquad = k_{sr}z_{21rl} + c_{xr}\dfrac{dz_{21rl}}{dt} + F_{cdrl} + k_{str}(z_{21rl} - z_{21rr}) \\ F_{srr} = k_{sr}z_{21rr} + c_{sr}\dfrac{dz_{21rr}}{dt} + (c_{srr} - c_{xr})\dfrac{dz_{21rr}}{dt} - k_{str}(z_{21rl} - z_{21rr}) \\ \qquad = k_{sr}z_{21rr} + c_{sr}\dfrac{dz_{21rr}}{dt} + F_{cdrr} - k_{str}(z_{21rl} - z_{21rr}) \end{cases} \quad (19)$$

The damping force changes Fcdfl, Fcdfr, Fcdrl, and Fcdrr illustrated in Expression (19) are estimated and output by using the traveling state information and the bounce motion state quantity estimated value as inputs in the correction value estimation unit 54, and the input vector u including the damping force changes Fcdfl, Fcdfr, Fcdrl, and Fcdrr is input to the bounce motion estimation unit 53, so that the change in the damping force can be considered.

Next, as an example of control by the suspension control unit 81, a processing outline of ride comfort control will be described with reference to FIG. 13.

Figure 13:
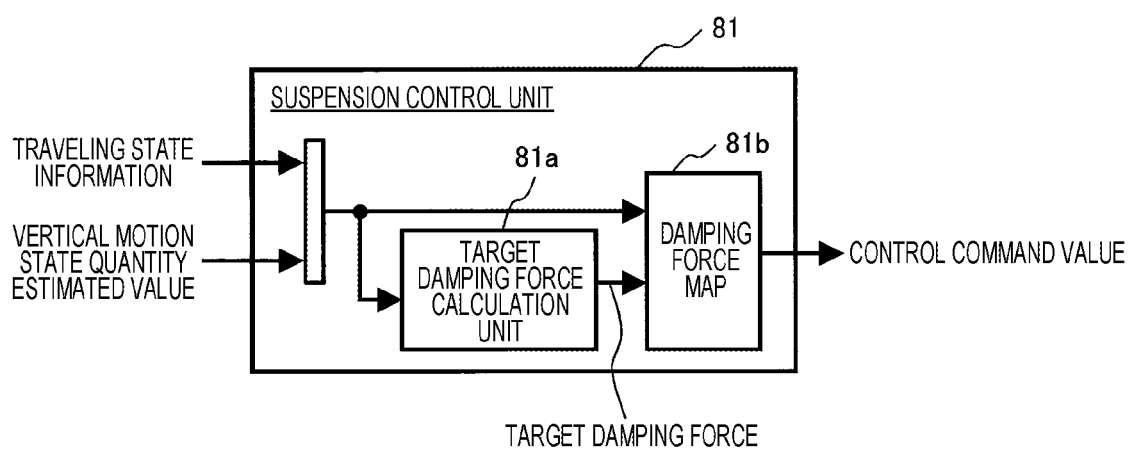
FIG. 13 is a diagram illustrating a conceptual configuration example of a suspension control unit 81 according to the third embodiment.

FIG. 13 is a conceptual diagram of the suspension control unit 81 that performs ride comfort control, which is one function of the control suspension device 82 according to the second embodiment.

The suspension control unit 81 receives the traveling state information detected or estimated by the acceleration sensor 2 and the gyro sensor 3 and the like, and the vertical motion state quantity estimated value estimated by the vehicle motion state estimation apparatus 50.

The suspension control unit 81 includes a target damping force calculation unit 81a and a damping force map 81b.

The target damping force calculation unit 81a calculates a target damping force of the control suspension device 82 based on the traveling state information and the vertical motion state quantity estimated value.

The damping force map 81b is map information of characteristics of the control suspension device 82 stored in advance, and receives the target damping force calculated by the target damping force calculation unit 81a and the vehicle motion state quantity detection value, and derives and outputs a control command value for controlling the control suspension device 82.

Next, an example of the processing result of the suspension control unit 81 will be described with reference to FIG. 14.

Figure 14:
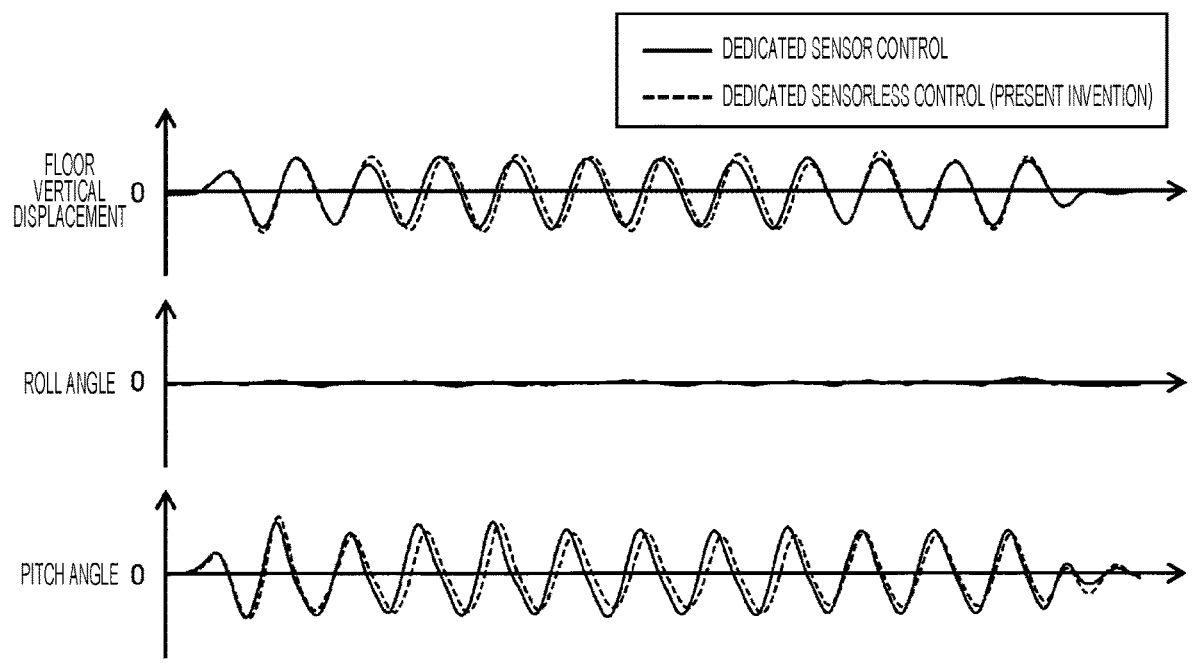
FIG. 14 is a diagram illustrating a temporal change of a processing result by the suspension control unit 81 according to the third embodiment.

FIG. 14 is an example of a result obtained by applying the suspension control unit 81 of the second embodiment to a vehicle in which the relationship between the relative displacement z21 and the longitudinal displacement Xzb is non-linear.

The solid line illustrated in FIG. 14 represents a result obtained by controlling the control suspension device 82 based on the estimated vertical motion state quantity detected and estimated using a dedicated sensor such as a vehicle height sensor or a vertical acceleration sensor, and a result obtained by controlling the control suspension device 82 based on the estimated vertical motion state quantity estimated by the vehicle motion state estimation apparatus 50 of the invention.

The floor vertical displacement, roll angle, and pitch angle of the dedicated sensorless control of the invention illustrated in FIG. 14 are substantially equal to the control with the dedicated sensor, and the same riding comfort as the control with the dedicated sensor can be realized.

With the above configuration, even in a vehicle having the non-linear characteristics of the suspension, it is possible to estimate the bounce motion state quantity such as a relative speed and a sprung vertical speed and generate a command current for controlling the suspension based on the estimated value. Therefore, it is possible to realize suspension control with higher performance than the conventional method that does not consider the non-linear characteristics.

Further, the processing result illustrated in FIG. 14 is a result obtained by processing using an update cycle of the traveling state information input to the vehicle motion state estimation apparatus 50 and the suspension control unit 81 using a value of 20 ms. If the traveling state information of a shorter update period can be acquired, the shorter the update period of the traveling state information, the vertical motion state quantity in a higher frequency band can be estimated with more accuracy, and higher-performance suspension control can be realized.

REFERENCE SIGNS LIST 1 wheel speed sensor
2 acceleration sensor
3 gyro sensor
4 steering angle sensor
5 braking/driving control unit
6 steering control unit
7 wheel
8 vehicle body
9 sprung center of gravity
10 vehicle
50 vehicle motion state estimation apparatus
51 rotational motion estimation unit
52 wheel speed fluctuation estimation unit
53 bounce motion estimation unit
54 correction value estimation unit
55 vertical motion estimation unit
56 output unit
81 suspension control unit
81a target damping force calculation unit
81b damping force map
82 control suspension device

The invention claimed is:

1. A vehicle motion state estimation control system in a vehicle in which wheels and a vehicle body are coupled via a suspension, the vehicle motion state estimation control system comprising: a controller configured to: estimate and output a state quantity of a bounce motion of the vehicle based on traveling state information of the vehicle; calculate a correction value to correct the state quantity of the bounce motion of the vehicle; operate a steering or braking system of the vehicle to perform a steering operation or a braking operation based on the state quantity of the bounce motion of the vehicle; calculate the correction value in consideration of a non-linear characteristic of the suspension; and use the state quantity of the bounce motion or a state quantity of a vertical motion as an input to calculate the correction value, and output the correction value based on a relationship between a vertical relative displacement of the vehicle body and the wheels and a longitudinal displacement of the wheels, which is the non-linear characteristic of the suspension.

2. The vehicle motion state estimation control system according to claim 1,
wherein the controller is configured to correct the state quantity of the bounce motion of the vehicle by estimating the state quantity of the bounce motion of the vehicle based on the correction value.

3. The vehicle motion state estimation control system according to claim 1,
wherein the controller assumes that a relationship between a vertical relative displacement of the vehicle body and the wheels and a longitudinal displacement of the wheels, which is a non-linear characteristic of the suspension, as linear characteristics, and
wherein the controller uses a state quantity of the bounce motion or a state quantity of the vertical motion, and outputs a correction value based on a difference between a non-linear characteristic of the suspension and a linear characteristic assumed by the controller.

4. The vehicle motion state estimation control system according to claim 1,
wherein the traveling state information is a rotational speed of the wheel, an acceleration in a front-rear direction and a lateral direction of the vehicle body, a yaw rate, and a steering angle.

5. The vehicle motion state estimation control system according to claim 1,
wherein the vehicle motion state estimation control system includes an external recognition sensor that detects environmental information around the vehicle, and the controller estimates a relative displacement when the vehicle is stationary on a horizontal plane based on the environmental information.

6. A vehicle comprising, a vehicle body coupled with the wheels via a suspension, and the controller according to claim 1.

7. The vehicle according to claim 6, further comprising:
a sensor including at least one of a wheel speed sensor, an acceleration sensor, a gyro sensor, or a steering angle sensor,
wherein the traveling state information of the vehicle is an output of the sensor.

8. The vehicle according to claim 6,
wherein a force generated by the suspension is controlled based on a state quantity estimated by the controller.

9. A vehicle motion state estimation control system in a vehicle in which wheels and a vehicle body are coupled via a suspension, the vehicle motion state estimation control system comprising: a controller configured to: estimate and output a state quantity of a vertical motion of the vehicle based on traveling state information of the vehicle; calculate a correction value to correct the state quantity of the vertical motion of the vehicle; operate a steering or braking system of the vehicle to perform a steering operation or a braking operation based on the state quantity of the vertical motion of the vehicle; calculate the correction value in consideration of a non-linear characteristic of a suspension; and use a state quantity of a bounce motion or the state quantity of the vertical motion as an input to calculate the correction value, and outputs the correction value based on a relationship between a vertical relative displacement of the vehicle body and the wheels and a longitudinal displacement of the wheels, which is a non-linear characteristic of the suspension.

10. The vehicle motion state estimation control system according to claim 2,
wherein the controller is configured to correct the state quantity of the vertical motion of the vehicle by estimating the state quantity of the vertical motion of the vehicle based on the correction value.

11. The vehicle motion state estimation control system according to claim 9,
wherein the controller assumes that a relationship between a vertical relative displacement of the vehicle body and the wheels and a longitudinal displacement of the wheels, which is a non-linear characteristic of the suspension, as linear characteristics, and
wherein the controller receives a state quantity of the bounce motion or a state quantity of the vertical motion, and outputs a correction value based on a difference between a non-linear characteristic of the suspension and a linear characteristic assumed by the controller.

12. The vehicle motion state estimation control system according to claim 9,
wherein the traveling state information is a rotational speed of the wheel, an acceleration in a front-rear direction and a lateral direction of the vehicle body, a yaw rate, and a steering angle.

13. The vehicle motion state estimation control system according to claim 9,
wherein the vehicle motion state estimation control system includes an external recognition sensor that detects environmental information around the vehicle, and estimates a relative displacement when the vehicle is stationary on a horizontal plane based on the environmental information.

14. A vehicle comprising wheels, a vehicle body coupled with the wheels via a suspension, and the controller according to claim 9.

15. The vehicle according to claim 14, further comprising:
a sensor including at least one of a wheel speed sensor, an acceleration sensor, a gyro sensor, or a steering angle sensor,
wherein the traveling state information of the vehicle is an output of the sensor.

16. The vehicle according to claim 14,
wherein a force generated by the suspension is controlled based on a state quantity estimated by the controller.

* * * * *